I. C. COVERT.
Ditching Machine.
No. 232,631. Patented Sept. 28, 1880.
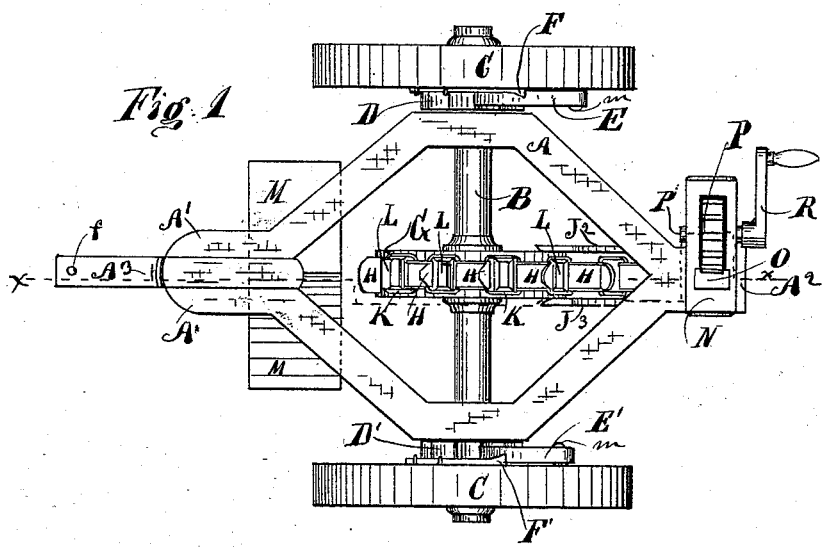
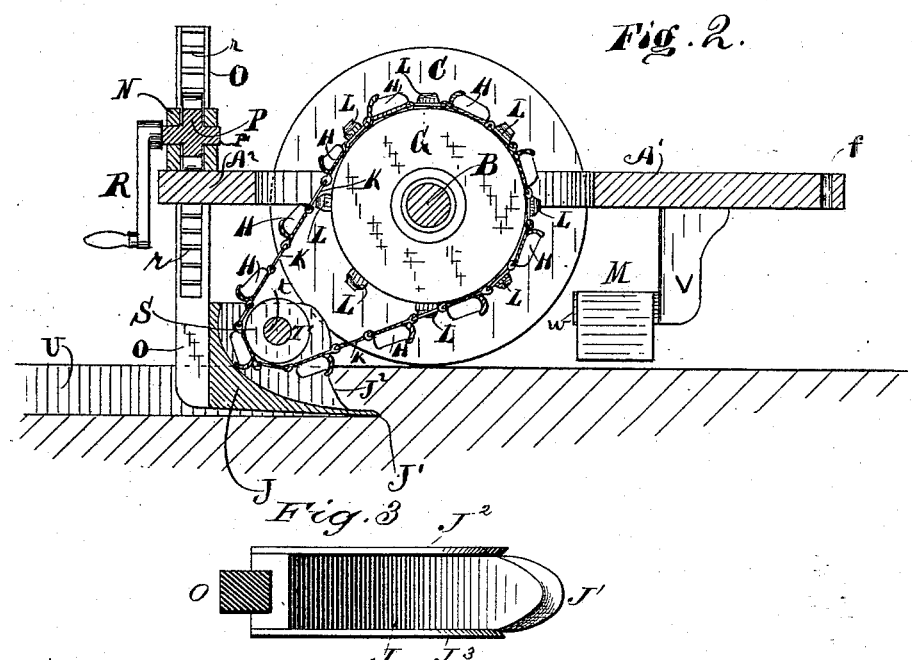
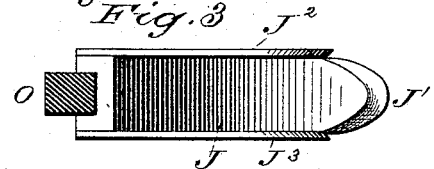
WITNESSES:
George H. Rinnett,
Zelora Phillips
INVENTOR.
Isaac C. Covert,
Per E. O. Frink.
his Attorney

UNITED STATES PATENT OFFICE.

ISAAC C. COVERT, OF FRANKLIN, INDIANA.

DITCHING-MACHINE.

SPECIFICATION forming part of Letters Patent No. 232,631, dated September 28, 1880.

Application filed January 19, 1880.

*To all whom it may concern:*

Be it known that I, ISAAC C. COVERT, of Franklin, in the county of Johnson and State of Indiana, have invented a new and useful Ditching-Machine, of which the following is a specification.

My invention relates to improvements in ditching-machines, in which I employ an elevator-chain provided with scraper-buckets operating in connection with a chain-wheel on the axle of the machine and an adjustable ditching-knife; and the objects of my improvements are, first, to provide a ditching-machine with a ditching-knife of peculiar construction; second, to provide facilities for the proper adjustment of the ditching-knife, by means of which the bottom of the ditch may be leveled or graded; third, to provide a means of operating the elevator-chain and scraper-buckets for the purpose of loosening and removing the dirt from the ditch and depositing it on the surface of the ground at each side of the ditch. I attain these objects by the mechanism illustrated in the accompanying drawings, in which—

Figure 1 represents a top or plan view of the entire machine, and Fig. 2 is a side elevation of the same, with the frame, axle, and ditching-knife in section. Fig. 3 is a plan view of a ditching-knife.

Similar letters refer to similar parts in the several views.

A, A', and $A^2$ represent the frame, constructed similar to that shown in Fig. 1. The frame at each side is provided with suitable boxes (not shown) to receive the axle B, said axle revolving freely in the boxes of the frame. The axle B is provided at each side of the frame A with the ratchet-wheels D D', said wheels being keyed fast to the axle. The main wheels C C are mounted loosely on the ends of the axle B, and each wheel C is provided with a pawl, E, and a spring, $m$, said spring being strong enough to hold the point of each pawl E in close contact with the ratchet-teeth of the wheels D D' as the machine advances, but weak enough to permit the ratchet-wheel teeth to slide under and by the points of the pawls as the machine is moved backward, thus allowing the wheels to turn freely on the axle without operating the elevator.

In the center of the axle B is securely fastened the chain-wheel G, the periphery of which is provided with suitable projecting teeth or spurs L L, to operate in the links K of the elevator-chain.

At the rear end, $A^2$, of the frame A is secured the housing N, having a vertical rectangular slot for the spur-wheel P to operate in, said spur-wheel being mounted on a shaft, P', and said shaft having a crank, R, attached to one end. The housing N is also provided with another vertical rectangular slot at one end of the slot P', and at right angles thereto, in which operates the rack-bar O, that is attached to the ditching-knife. The rack O is provided with teeth $r$, that work in gear with the spur-wheel P, by means of which and the crank R the ditching-knife J J' may be raised or lowered at pleasure. The ditching-knife J J' is of peculiar construction—to wit, the interior is constructed with a curve, as shown in Fig. 2, which forms the inside bottom of the knife and permits the dirt to be carried freely through it. The point J' is an extension of the curved bottom and projects several inches beyond the sides $J^2$. The extreme outer edge at J' is rounded and made comparatively sharp, and is slightly inclined to pitch downward, so as to freely take hold of the dirt. The sides $J^2 J^3$ of the ditching-knife also project well forward, and are beveled on their insides, so as to slice off the dirt more readily at the sides of the ditch. Between the sides $J^2 J^3$ is located the roller-wheel T, supported by the bearings $t$, which enter and revolve in the sides J, or the bearing $t$ may be made fast to the sides of the knife and the roller T revolve on it, if desired.

The elevator-chain is composed of a series of links and plates in the ordinary manner, and the scraper-buckets H are secured to the plates, or the bottom of each bucket may form the plate between the links K, as shown. Said chain operates on the chain-wheel G and roller T, as shown in Fig. 2.

In front of the chain-wheel G that part of the frame A marked A' is provided with an L-shaped downward-projecting bracket, V $w$, the part $w$ being horizontal and extending from the part V toward the chain-wheel G. The upper surface of the part $w$ is beveled on both sides, similar to an inverted V, and is provided with a double-inclined V-shaped table, M, to receive and distribute the dirt on each side of the ditch as it is brought up and dumped on said table by the elevator-buckets H. The tongue $A^3$ is very short and attached to the frame A, as shown in Fig. 1. Said tongue is provided with a hole, $f$, by means of which and the chain the ditching-machine may be attached to an ordinary farm-truck, or provided with double-trees attached to horses for operating the ditching-machine.

Having thus fully described the construction and arrangement of parts in my invention, I will now describe its mode of operation as follows, to wit: Power being attached to the tongue A', the machine is moved over the line of the trench to be cut. The operator turns the crank R so as to permit the point J' of the ditching-knife to enter the ground a few inches. The sides $J^2 J^3$ also cut the sides of the ditch, and the forward movement of the machine causes the wheels C C to revolve. The pawls E E' take hold of the ratchet-teeth of the ratchets D D, causing the main axle B and chain-wheel G to rotate. The wheel G causes the elevator-chain to move, and as the buckets H enter the ditching-knife J they loosen and bring up the dirt cut by the said knife. As the dirt passes over the top of the chain-wheel G it is dumped onto the table M and distributed on each side of the ditch between the ditch and inside of the wheels C C. As more depth is required the knife J is lowered. Should the chain K H become too tight by reason of lowering the knife J and roller T, then more links may be added.

It is obvious that in grading the ditch all high places in the bottom may be removed by going over them one or more times and lowering the ditching-knife until the surface of the bottom of the ditch is level. Should the dirt adhere to the buckets H, it is obvious that any of the well-known cleaners for such purpose may be employed, or the dirt scraped out as the buckets clog.

What I claim as new, and desire to secure by Letters Patent, is—

1. The ditching-knife J J', constructed with a rearward and upward curved inner receptacle, the lower and rear walls of which form an inclined bottom inside of the knife, and, together with the sides, a curved-upward guide proportioned to the figure and traverse of the elevating-bucket for the discharge of dirt at the top, the extreme front end of the inclined bottom forming the point J', which projects some distance in front of the vertical sides $J^2 J^3$, the front end being rounded horizontally and made sharp on its edge, the sides $J^2 J^3$ forming the side walls of the curved receptacle and having their front edges extending forward, and also made sharp on the outer sides, as shown and described.

2. In combination with the ditching-knife J J' $J^2 J^3$, having its various parts constructed as described, the rack-bar O, the spur-wheel P, and crank R, as specified.

3. In a ditching-machine having a ditching-knife, J J' $J^2 J^3$, constructed as described, combined with the rack-bar O, the spur-wheel P, the crank R, the roller T, the bucket-chain A H, the chain-wheel G, the axle B, and wheels C C, substantially as shown and described.

In testimony whereof I have signed my name to this specification in the presence of two subscribing witnesses.

ISAAC C. COVERT.

Witnesses:
E. O. FRINK,
G. H. RENNETT.